(12) United States Patent
Kogure et al.

(10) Patent No.: US 7,829,612 B2
(45) Date of Patent: Nov. 9, 2010

(54) LIGHT DIFFUSIVE POLYCARBONATE RESIN COMPOSITION AND LIGHT DIFFUSIVE PLATE USING SAID RESIN COMPOSITION

(75) Inventors: Masami Kogure, Chiba (JP); Hiroshi Kawato, Chiba (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 388 days.

(21) Appl. No.: 11/913,181

(22) PCT Filed: May 25, 2006

(86) PCT No.: PCT/JP2006/310447

§ 371 (c)(1), (2), (4) Date: Oct. 31, 2007

(87) PCT Pub. No.: WO2006/132092

PCT Pub. Date: Dec. 14, 2006

(65) Prior Publication Data

US 2009/0080079 A1    Mar. 26, 2009

(30) Foreign Application Priority Data

Jun. 8, 2005 (JP) .............................. 2005-168904

(51) Int. Cl.
  *C08K 5/3475* (2006.01)
  *C08K 5/521* (2006.01)
  *C08K 5/49* (2006.01)
  *C08K 5/1515* (2006.01)
  *C08K 5/5415* (2006.01)

(52) U.S. Cl. .................... 524/91; 524/129; 524/140; 524/502; 524/537; 524/611

(58) Field of Classification Search .................... 524/91, 524/129, 140, 502, 537, 611
See application file for complete search history.

(56) References Cited

U.S. PATENT DOCUMENTS

| | | | |
|---|---|---|---|
| 5,352,747 A * | 10/1994 | Ohtsuka et al. ............. | 525/464 |
| 5,773,134 A * | 6/1998 | Inokuchi et al. ............. | 428/220 |
| 6,556,347 B1 * | 4/2003 | Murayama et al. .......... | 359/453 |
| 6,808,804 B2 * | 10/2004 | Hotaka et al. ............... | 428/357 |
| 7,009,001 B2 * | 3/2006 | Kawato et al. .............. | 525/146 |
| 7,098,263 B2 * | 8/2006 | Mitsunaga et al. .......... | 524/445 |
| 7,553,893 B2 * | 6/2009 | Kawato et al. .............. | 524/109 |
| 2003/0165666 A1 * | 9/2003 | Fujiwara et al. ............. | 428/143 |
| 2007/0213452 A1 | 9/2007 | Kawato et al. | |
| 2008/0300378 A1 * | 12/2008 | Suga et al. ................... | 528/195 |
| 2009/0080079 A1 * | 3/2009 | Kogure et al. ............... | 359/599 |
| 2009/0116115 A1 * | 5/2009 | Kogure et al. ............... | 359/599 |

FOREIGN PATENT DOCUMENTS

| | | | |
|---|---|---|---|
| JP | 62 138514 | | 6/1987 |
| JP | 04 328148 | | 11/1992 |
| JP | 11 181197 | | 7/1999 |
| JP | 2005 112963 | | 4/2005 |
| JP | 2005 247999 | | 9/2005 |
| JP | 2006016497 | * | 1/2006 |
| JP | 2006 117822 | | 5/2006 |

OTHER PUBLICATIONS

U.S. Appl. No. 11/994,031, filed Dec. 27, 2007, Kawato et al.
U.S. Appl. No. 11/913,181, filed Oct. 31, 2007, Kogure et al.

* cited by examiner

*Primary Examiner*—Kriellion A Sanders
(74) *Attorney, Agent, or Firm*—Oblon, Spivak, McClelland, Maier & Neustadt, L.L.P.

(57) ABSTRACT

The present invention provides a light-diffusive polycarbonate-based resin composition which includes (A) 100 parts by mass of an aromatic polycarbonate resin, (B) 0.01 to 10 parts by mass of a light-diffusing agent, and (C) 0.1 to 20 parts by mass of a styrene-(meth)acrylic ester copolymer, and a light-diffusing plate formed from the composition. The light-diffusive polycarbonate-based resin composition can be injection-molded to form a light-diffusing plate having satisfactory precision in thickness for use in comparatively large liquid crystal displays having a size larger than 20 inches.

14 Claims, No Drawings

LIGHT DIFFUSIVE POLYCARBONATE RESIN COMPOSITION AND LIGHT DIFFUSIVE PLATE USING SAID RESIN COMPOSITION

TECHNICAL FIELD

The present invention relates to a light-diffusive polycarbonate-based resin composition suitable for, for example, light-diffusing plates in liquid crystal displays; optical elements including an optical lens, a light-guiding plate (light guide), and a light-diffusing plate; and glass substitutes including covers for street lamps and window panes for vehicles and buildings. The invention also relates to a light-diffusing plate employing the resin composition.

BACKGROUND ART

In recent years, liquid crystal displays (LCDs) have been employed not only in notebook-sized personal computers (PCs) and monitors but also in ordinary televisions (TVs). For light-diffusing plates (thickness: 1 to 3 mm) which are incorporated in televisions to serve as a backlight source for ensuring sufficient brightness, use of acrylic resin plates is currently a mainstream, particularly for such plates of 20 inches or thereabouts.

However, since acrylic resin exhibits low heat resistance and high moisture absorption, dimensional stability is unsatisfactory, resulting in problematic warpage of a light-diffusing plate for a large screen size.

Thus, recently, polycarbonate (hereinafter may be abbreviated as PC) resin, which exhibits more excellent heat resistance and moisture absorption resistance as compared with acrylic resin, has been more widely employed as a matrix resin for light-diffusing plates.

Hitherto, PC resin light-diffusing plates have been generally formed through extrusion.

The reason why PC resin is extruded is that, when PC resin—having low flowability—is injection-molded to form a plate having a size larger than 20 inches, the molded products suffer bad color tone due to shear heating, as well as poor precision in thickness, lack of uniformity in thickness, etc., and that these problems are avoided through employment of extrusion.

However, extrusion is not advantageous in terms of cost. For example, sheet raw material obtained through extrusion must be subjected to secondary processing such as cutting to predetermined dimensions, or waste pieces may be produced by mismatch between a size of light-diffusing plates of interest and a given sheet width.

Therefore, there have been employed, as injection molding material which can reduce shape-processing cost as compared with extrusion material for forming a light-diffusing plate, acrylic resin, MS resin, and cycloolefin resin, which exhibit high flowability. PC resin, which exhibits excellent heat resistance and moisture absorption resistance but exhibits low flowability, encounters difficulty in injection molding to form a light-diffusing plate having a thickness of about 2 mm and a size larger than 20 inches.

Meanwhile, when employed as an optical plastic material, PC resin exhibits disadvantageously large birefringence. There has already been known an optical resin material for solving this problem, which material is formed through polymerization between a linear aromatic polycarbonate and an unsaturated compound essentially including an aromatic vinyl compound (see patent Document 1).

However, patent Document 1 does not disclose production of a light-diffusing plate including addition of a light-diffusing agent to PC resin.

[Patent Document 1] Japanese Patent Application Laid-Open (kokai) No. 62-138514

DISCLOSURE OF THE INVENTION

In an attempt to solve the aforementioned problems involved in conventional techniques, an object of the present invention is to provide a light-diffusive polycarbonate-based resin composition which can form, through injection molding, a plate having a size larger than 20 inches and a thickness of 2 mm. Another object is to provide a light-diffusing plate formed from the composition.

In order to attain the aforementioned objects, the present inventors have conducted extensive studies, and have found that, through incorporation of a styrene-(meth)acrylic ester copolymer into an aromatic polycarbonate resin, the produced polycarbonate-based resin composition exhibits enhanced flowability and enhanced residence stability in a molding machine, whereby the objects can be attained. The present invention has been accomplished on the basis of this finding.

Accordingly, the present invention provides a light-diffusive polycarbonate-based resin composition which includes (A) 100 parts by mass of an aromatic polycarbonate resin, (B) 0.01 to 10 parts by mass of a light-diffusing agent, and (C) 0.1 to 20 parts by mass of a styrene-(meth)acrylic ester copolymer.

According to the light-diffusive polycarbonate-based resin composition of the present invention, a styrene-(meth)acrylic ester copolymer is incorporated into an aromatic polycarbonate resin. Therefore, flowability of the light-diffusive resin composition is remarkably enhanced, and residence stability in a molding machine such as an injection-molding apparatus can be enhanced. Thus, a light-diffusing plate for use in LCDs and similar devices of a size of 20 inches (50.8 cm) or more can be produced through injection molding of the resin composition. Thus, problems involved in light-diffusing plates made of acrylic resin; i.e., poor heat resistance, poor moisture absorption resistance, and warpage caused by an increased plate size, can be solved, whereby a wide-area and thin (0.5 to 3 mm) light-diffusing plate exhibiting excellent heat and moisture absorption resistance can be formed through injection molding of the polycarbonate-based resin.

BEST MODES FOR CARRYING OUT THE INVENTION

A characteristic feature of the light-diffusive polycarbonate-based resin composition of the present invention is that the composition includes (A) 100 parts by mass of an aromatic polycarbonate resin, (B) 0.01 to 10 parts by mass of a light-diffusing agent, and (C) 0.1 to 20 parts by mass of a styrene-(meth)acrylic ester copolymer (unless otherwise specified, the unit "part(s)" refers to "part(s) by mass").

In the light-diffusive polycarbonate-based resin composition of the present invention, the aromatic polycarbonate resin, which is component (A), may be a polycarbonate produced through a customary method generally including reaction between a dihydric phenol and phosgene or a polycarbonate precursor such as a carbonate ester compound. Specifically, such a polycarbonate is produced through reaction between a dihydric phenol and a carbonate precursor such as phosgene or transesterification reaction between a dihydric phenol and a carbonate precursor such as diphenyl carbonate, in a solvent such as methylene chloride in the presence of a known acid-acceptor or a molecular weight modifier and an optional branching agent.

A variety of dihydric phenols may be employed in the reactions. Among them, 2,2-bis(4-hydroxyphenyl)propane (trivial name: bisphenol A) is particularly preferred. Examples of bisphenols other than bisphenol A include bis (hydroxyaryl)alkanes such as bis(4-hydroxyphenyl)methane, 1,1-bis(4-hydroxyphenyl)ethane, 2,2-bis(4-hydroxyphenyl) butane, 2,2-bis(4-hydroxyphenyl)octane, 2,2-bis(4-hydroxyphenyl)phenylmethane, 2,2-bis(4-hydroxy-1-methylphenyl)propane, bis(4-hydroxyphenyl)naphthylmethane, 1,1-bis (4-hydroxy-t-butylphenyl)propane, 2,2-bis(4-hydroxy-3-bromophenyl)propane, 2,2-bis(4-hydroxy-3,5-tetramethylphenyl)propane, 2,2-bis(4-hydroxy-3-chlorophenyl)propane, 2,2-bis(4-hydroxy-3,5-tetrachlorophenyl)propane, and 2,2-bis(4-hydroxy-3,5-tetrabromophenyl)propane; bis(hydroxyaryl)cycloalkanes such as 1,1-bis(4-hydroxyphenyl) cyclopentane, 1,1-bis(4-hydroxyphenyl)cyclohexane, and 1,1-bis(4-hydroxyphenyl)-3,5,5-trimethylcyclohexane; dihydroxyaryl ethers such as 4,4'-dihydroxyphenyl ether and 4,4'-dihydroxy-3,3'-dimethylphenyl ether; dihydroxydiarylsulfides such as 4,4'-dihydroxydiphenylsulfide and 4,4'-dihydroxy-3,3'-dimethyldiphenylsulfide; dihydroxydiarylsulfoxides such as 4,4'-dihydroxydiphenylsulfoxide and 4,4'-dihydroxy-3,3'-dimethyldiphenylsulfoxide; dihydroxydiarylsulfones such as 4,4'-dihydroxydiphenylsulfone and 4,4'-dihydroxy-3,3'-dimethyldiphenylsulfone; and dihydroxydiphenyls such as 4,4'-dihydroxydiphenyl. These dihydric phenols may be employed singly or in combination of two or more species.

Examples of the carbonate ester compound include diarylcarbonates such as diphenylcarbonate; and dialkylcarbonates such as dimethylcarbonate and diethylcarbonate. Such carbonate ester compounds may be used, so long as they are employed as a molecular weight modifier generally employed in polymerization to form polycarbonate.

Specifically, the molecular weight modifier may be a monohydric phenol. Examples of such a phenol include phenol, o-n-butylphenol, m-n-butylphenol, p-n-butylphenol, o-isobutylphenol, m-isobutylphenol, p-isobutylphenol, o-t-butylphenol, m-t-butylphenol, p-t-butylphenol, o-n-pentylphenol, m-n-pentylphenol, p-n-pentylphenol, o-n-hexylphenol, m-n-hexylphenol, p-n-hexylphenol, p-t-octylphenol, o-cyclohexylphenol, m-cyclohexylphenol, p-cyclohexylphenol, o-phenylphenol, m-phenylphenol, p-phenylphenol, o-n-nonylphenol, m-nonylphenol, p-n-nonylphenol, o-cumylphenol, m-cumylphenol, p-cumylphenol, o-naphthylphenol, m-naphthylphenol, p-naphthylphenol, 2,5-di-t-butylphenol, 2,4-di-t-butylphenol, 3,5-di-t-butylphenol, 2,5-dicumylphenol, 3,5-dicumylphenol, p-cresol, bromophenol, and tribromophenol. Of these, p-t-butylphenol, p-cumylphenol, p-phenylphenol, etc. are preferably employed.

The branching agent may be a compound having three or more functional groups such as 1,1,1-tris(4-hydroxyphenyl) ethane, α,α',α"-tris(4-hydroxyphenyl)-1,3,5-triisopropylbenzene, 1-[α-methyl-α-(4'-hydroxyphenyl)ethyl]-4-[α',α'-bis(4"-hydroxyphenyl)ethyl]benzene, phloroglucin, trimellitic acid, and isatinbis(o-cresol).

Generally, the aromatic polycarbonate resin employed in the present invention is preferably has a viscosity-average molecular weight of 10,000 to 100,000, more preferably 15,000 to 40,000.

In the present invention, when the aromatic polycarbonate resin, which is component (A), has a structural repeating unit represented by formula (I) and a structural repeating unit represented by formula (II), with the structural repeating unit (II) content being 1 to 30% by mass, preferably 5 to 20% by mass, and the aromatic polycarbonate resin, which is component (A), is a polycarbonate having a viscosity number of 30 to 71, flowability of the polycarbonate resin during molding can be enhanced.

The aforementioned aromatic polycarbonate copolymer is a phenol-modified diol co-polycarbonate and may be produced through interfacial polymerization, which is a customary production method. Specifically, the aromatic polycarbonate copolymer may be produced through reaction of a dihydric phenol, a phenol-modified diol, and a carbonate precursor such as phosgene. More specifically, for example, a dihydric phenol, a phenol-modified diol, and a carbonate precursor such as phosgene are reacted in an inert solvent such as methylene chloride in the presence of a known acid-acceptor or a molecular weight modifier and an optional catalyst or branching agent.

The aromatic polycarbonate copolymer has structural repeating units represented by formulas (I) and (II):

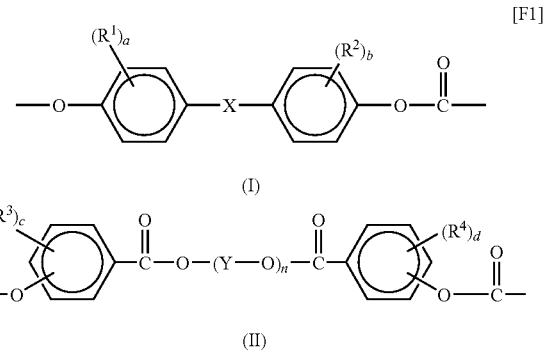

(wherein $R^3$ to $R^4$, X, Y, a to d, and n are described hereinbelow). Examples of the dihydric phenol includes compounds represented by formula (Ia).

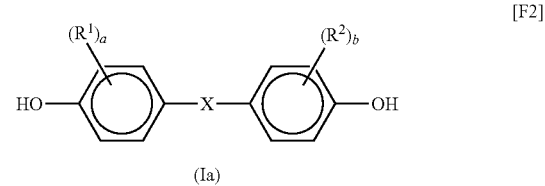

In formula (Ia), $R^1$ and $R^2$ each represent an alkyl group having 1 to 6 carbon atoms, which may be a linear-chain, branched-chain, or cyclic. Specific examples of the alkyl group include methyl, ethyl, n-propyl, isopropyl, n-butyl, isobutyl, tert-butyl, n-pentyl, isopentyl, n-hexyl, isohexyl, cyclopentyl, and cyclohexyl. "a" and "b" each represent the number of substituent(s) present in $R^1$ and $R^2$, respectively, and is an integer of 0 to 4. When a plurality of $R^1$s are present, they may be identical to or different from one another, and when a plurality of $R^2$s are present, they may be identical to or different from one another.

X represents a single bond, an alkylene group having 1 to 8 carbon atoms (e.g., methylene, ethylene, propylene, butylene, pentylylene, or hexylene), a C2 to C8 alkylidene group (e.g., ethylidene or isopropylidene), a cycloalkylene group having 5 to 15 carbon atoms (e.g., cyclopentylene or cyclohexylene), a cycloalkylidene group having 5 to 15 carbon atoms (e.g., cyclopentylidene or cyclohexylidene), —S—, —SO—, —SO$_2$—, —O—, —CO—, or a bond represented by formula (III-1) or (III-2).

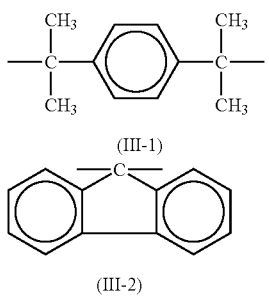

Dihydric phenols represented by formula (Ia) include a variety of compounds. Of these, 2,2-bis(4-hydroxyphenyl) propane (trivial name: bisphenol A) is particularly preferred. Examples of bisphenols other than bisphenol A include bisphenols described in relation to component (A), 9,9-bis(4-hydroxyphenyl)fluorene; dihydroxydiarylfluorenes, such as 9,9-bis(4-hydroxy-3-methylphenyl)fluorene; 1,3-bis(4-hydroxyphenyl)adamantane; 2,2-bis(4-hydroxyphenyl)adamantane; dihydroxydiaryladamantanes such as 1,3-bis(4-hydroxyphenyl)-5,7-dimethyladamantane; bis(4-hydroxyphenyl)diphenylmethane; 4,4'-[1,3-phenylenebis(1-methylethylidene)]bisphenol; 10,10-bis(4-hydroxyphenyl)-9-anthrone; 1,5-bis(4-hydroxyphenylthio)-2,3-dioxypentaene; and α,ω-bishydroxyphenylpolydimethylsiloxane compounds.

These dihydric phenols may be used singly or in combination of two or more species.

Any molecular weight modifiers may be employed, so long as they are generally employed in polymerization to form PC resins. Specifically, examples of preferably employed monohydric phenol molecular weight modifiers include molecular weight modifiers described in relation to component (A); monoalkylphenols each having a linear or branched alkyl group having average 12 to 35 carbon atoms at o-, m-, or p-position; 9-(4-hydroxyphenyl)-9-(4-methoxyphenyl)fluorene; 9-(4-hydroxy-3-methylphenyl)-9-(4-methoxy-3-methylphenyl)fluorene; and 4-(1-adamantyl)phenol. Among these monohydric phenols, p-t-butylphenol, p-cumylphenol, p-phenylphenol, etc. are preferably employed.

Examples of preferably employed catalysts include phase-transfer catalysts such as a tertiary amine or a salt thereof, a quaternary ammonium salt, and a quaternary phosphonium salt.

Examples of the tertiary amine include triethylamine, tributylamine, N,N-dimethylcyclohexylamine, pyridine, and dimethylaniline, and examples of the tertiary amine salt include hydrochlorides or hydrobromides thereof. Examples of the quaternary ammonium salt include trimethylbenzylammonium chloride, triethylbenzylammonium chloride, tributylbenzylammonium chloride, trioctylmethylammonium chloride, tetrabutylammonium chloride, and tetrabutylammonium bromide, and examples of the quaternary phosphonium salt include tetrabutylphosphonium chloride and tetrabutylphosphonium bromide. These catalyst may be used singly or in combination of two or more species. Among these catalysts, tertiary amines are preferred, with triethylamine being particularly preferred.

Examples of the inert organic solvent include chlorohydrocarbons such as dichloromethane (methylene chloride), trichloromethane, tetrachloromethane, 1,1-dichloroethane, 1,2-dichloroethane, 1,1,1-trichloroethane, 1,1,2-trichloroethane, 1,1,1,2-tetrachloroethane, 1,1,2,2-tetrachloroethane, pentachloroethane, and chlorobenzene; toluene; and acetophenone. These organic solvents may be used singly or in combination of two or more species. Of these, methylene chloride is particularly preferred.

Examples of branching agent which can be employed in interfacial polymerization include those exemplified in relation to component (A).

For example, there may be employed as the branching agent a compound having three or more functional groups such as 1,1,1-tris(4-hydroxyphenyl)ethane, 4,4'-[1-[4-[1-(4-hydroxyphenyl)-1-methylethyl]phenyl]ethylidene]bisphenol, α,α', α''-tris(4-hydroxyphenyl)-1,3,5-triisopropylbenzene, 1-[α-methyl-α-(4'-hydroxyphenyl)ethyl]-4-[α',α'-bis(4''-hydroxyphenyl)ethyl]benzene, phloroglucin, trimellitic acid, or isatinbis(o-cresol).

The phenol-modified diol employed in the present invention is a compound represented by formula (IIa):

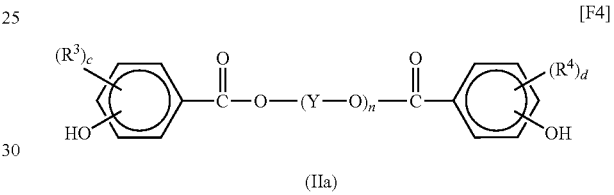

(IIa)

(wherein R$^3$ and R$^4$ each represent an alkyl group having 1 to 3 carbon atoms; Y is a linear or branched alkylene group having 2 to 15 carbon atoms; c and d each are an integer of 0 to 4; and n is an integer of 2 to 200). Examples of the alkyl group represented by R$^3$ or R$^4$ include methyl, ethyl, n-propyl, and isopropyl.

When a plurality of R$^3$s are present, they may be identical to or different from one another, and when a plurality of R$^4$s are present, they may be identical to or different from one another.

Examples of the linear or branched alkylene group having 2 to 15 carbon atoms represented by Y include alkylene groups such as ethylene, propylene, butylene, isobutylene, pentylene, and isopentylene; and alkylidene groups such as ethylidene, propylidene, isopropylidene, butylidene, isobutylidene, pentylidene, and isopentylidene. The "n" is preferably 2 to 200, more preferably 6 to 70.

The phenol-modified diol represented by the aforementioned formula (IIa) is, for example, a compound which is derived from hydroxybenzoic acid or its alkyl ester or acid chloride and a polyether diol. The phenol-modified diol may be synthesized through any of the methods disclosed in Japanese Patent Application Laid-Open (kokai) Nos. 62-79222, 60-79072, and 2002-173465 and in other documents. The phenol-modified diol produced through the above methods is preferably subjected to appropriate purification.

In one preferred purification method, the reaction system is evacuated at a final stage of reaction, to thereby remove excessive starting materials (e.g., p-hydroxybenzoic acid). In another preferred purification method, a phenol-modified diol is washed with a material such as water or an alkaline solution (e.g., aqueous sodium hydrogencarbonate solution).

Typical examples of alkyl hydroxybenzoate include methyl hydroxybenzoate and ethyl hydroxybenzoate. Polyether diol, which is represented by HO—(Y—O)$_n$—H (wherein Y and n have the same meanings as defined above), has a structural repeating unit of a linear or branched oxyalkylene group having 2 to 15 carbon atoms. Specific examples include polyethylene glycol, polypropylene glycol, and polytetramethylene glycol. From the viewpoints of availability and hydrophobicity, polytetramethylene glycol is particularly preferred. The number of repetition of oxyalkylene groups (n) is 2 to 200, preferably 6 to 70. When n is 2 or more, high efficiency of copolymerization of phenol-modified diol can be attained, whereas when n is 70 or less, a drop in heat resistance of PC copolymer can be prevented. Both cases are advantageous.

Typical examples of the acid chloride include an acid chloride produced from hydroxybenzoic acid and phosgene. More specifically, the chloride compound can be produced through a method disclosed in Japanese Patent No. 2652707 or other documents. Hydroxybenzoic acid or its alkyl ester may be in p-, m-, or o-form. Among them, the p-form is preferred from the viewpoint of copolymerization reaction efficiency. In contrast, the o-form may exhibit poor copolymerization reactivity due to steric hindrance of the hydroxyl group.

In the production of PC copolymer, phenol-modified diol is most preferably used in the form of methylene chloride solution in order to prevent impairment such as degradation. If the methylene chloride solution cannot be used, phenol-modified diol may also be used in the form of an aqueous alkaline (e.g., NaOH) solution.

When the amount of phenol-modified diol copolymerized to form PC copolymer increases, flowability of the resin is improved. However, heat resistance decreases. Therefore, the amount of phenol-modified diol copolymerized is preferably predetermined in accordance with the balance between flowability and heat resistance of interest. When the amount of phenol-modified diol copolymerized is excessively large, the copolymer becomes elastomeric, as disclosed in Japanese Patent Application Laid-Open (kokai) No. 62-79222. Such an elastomeric polymer may fail to find the same uses as those of general PC resins. In order to maintain heat resistance as high as 100° C. or higher, the PC copolymer of the present invention preferably has a phenol-modified diol residue content of 1 to 30% by mass, more preferably 1 to 20% by mass, still more preferably 1 to 15% by mass.

In the present invention, the PC copolymer, which is component (A), preferably has a viscosity number of 30 to 71 (equivalent to an Mv (viscosity-average molecular weight) of 10,000 to 28,100), more preferably 37 to 62 (equivalent to an Mv of 13,100 to 24,100). When the viscosity number is 30 or more, excellent mechanical properties can be attained, whereas when the viscosity number is 71 or less, the effect of the copolymerized comonomer can be fully attained. In order to realize high flowability, a large amount of comonomer is required. In this case, when the viscosity number is 71 or less, a considerable drop in heat resistance which would otherwise be caused by incorporation of comonomer is prevented. Note that the viscosity number is a value determined in accordance with ISO 1628-4 (1999).

In the present invention, the aforementioned polycarbonate copolymer may be employed singly as the aromatic polycarbonate resin, which is component (A). However, preferably, the polycarbonate copolymer and an additional aromatic polycarbonate resin are used in combination from the viewpoint of balance in mechanical properties.

The above-mentioned additional aromatic polycarbonate resin may be any of the same aromatic polycarbonate resins as those described in relation to component (A) or a commercial product.

The ratio by mass of polycarbonate copolymer to additional aromatic polycarbonate resin is preferably 1:99 to 90:10, more preferably 5:95 to 50:50.

The light-diffusing agent, which is component (B), may be any solid, so long as it is optically transparent and has a refractive index differing from that of the aforementioned aromatic polycarbonate resin. The light-diffusing agent may be used singly or in combination of two or more species. In either case, the particle size of the agent is preferably about 0.2 to about 50 μm. Specific examples of the light-diffusing agent include acrylic resin beads, silica beads, silicone resin beads, glass beads, hollow beads of the same materials, amorphous powder of the same materials, and plate-like particle powder of the same materials.

The acrylic resin beads preferably have a mean particle size of about 0.2 to about 20 μm. The silica beads preferably have a mean particle size of about 2 to about 20 μm, and completely spherical silica beads made of high-purity synthesized silica and having a mean particle size of 2 to 5 μm are particularly preferred. The silicone resin beads preferably have a mean particle size of about 0.5 to 20 μm. No particular limitation is imposed on the material of the glass beads employed in the invention, and various glass materials such as low-alkali glass (E glass) and high-refractive glass (refractive index of about 1.9 to about 2.2) may be employed. From the viewpoint of low cost, E glass beads having a mean particle size of about 5 to about 50 μm are preferred, with a mean particle size of about 5 to about 7 μm being more preferred and about 10 to about 12 μm being particularly preferred. Preferably, any of these beads preferably exhibits a single-peak particle size distribution profile, and assume completely spherical particles having retro-reflection function.

In order to produce a light-diffusive polycarbonate-based resin composition exhibiting excellent transparency (YI) through a simple process, the light-diffusing agent is particularly preferably silica beads, glass beads, and amorphous powder of a crystalline substance exhibiting an excellent light-diffusive function (particularly powder of crystalline silica).

Examples of preferred (meth)acrylic ester in the styrene-(meth)acrylic ester copolymer, which is component (C), include methacrylic esters selected from among methyl methacrylate, ethyl methacrylate, butyl methacrylate, phenyl methacrylate, glycidyl methacrylate, benzyl methacrylate, dicyclopentanyl methacrylate, stearyl methacrylate, cyclohexyl methacrylate, and other methacrylates.

These (meth)acrylic esters may be used singly or in combination of two or more species. Of these, methyl methacrylate and phenyl methacrylate are particularly preferred.

The ratio of styrene to (meth)acrylic ester in the copolymer; i.e., the ratio by mole of styrene to (meth)acrylic ester is preferably 50:50 to 99:1, particularly preferably 60:40 to 95:5.

The styrene-(meth)acrylic ester copolymer preferably has a melt index (MI) of about 30 to about 200 (g/10 min), from the viewpoints of enhanced flowability and balanced mechanical strength.

In order to ensure a transparency required for light-diffusive resin material, the styrene-(meth)acrylic ester copolymer preferably has such a refractive index that the difference between the index and that of the aromatic polycarbonate resin, which is component (A), is adjusted to 0.1 or less.

In the light-diffusive polycarbonate-based resin composition of the present invention, the styrene-(meth)acrylic ester copolymer (C) is used in an amount of 0.1 to 20 parts by mass with respect to 100 parts by mass of aromatic polycarbonate resin (A), more preferably 1 to 10 parts by mass. When the amount is 0.1 parts by mass or more, flowability can be enhanced, whereas when the amount is 20 parts by mass or less, appropriate transmittance can be attained.

The UV-absorber, which is an optional component (D) of the light-diffusive polycarbonate-based resin composition of the present invention, may have a peak wavelength in a UV-absorption spectrum of 290 to 330 nm. Such a UV-absorber is preferably selected from among malonate ester compounds, oxalylanilide compounds, and benzotriazole compounds. These UV-absorbers may be used singly or in combination of two or more species.

Examples of the malonate ester compounds include benzylidene bisdiethylmalonate, 4-methoxyphenyl-methylene-dimethyl ester, and examples of the oxalylanilide compounds include a hydrocarbon group having a 1 to 12 carbon atoms. The benzotriazole compounds are preferably an acrylic polymer having a side chain of a benzotriazole skeleton, and examples of such polymers include a polymethyl methacrylate (PMMA) compound having a side chain of 2-(5-t-octyl-2-hydroxyphenyl)benzotriazole.

The UV-absorber, which is component (D), is preferably used in an amount of 0.05 to 5 parts by mass with respect to 100 parts by mass of to the aromatic polycarbonate resin (component (A)), more preferably 0.1 to 3 parts by mass. When the amount is 0.05 parts by mass or more, excellent light-fastness can be attained, whereas when the amount is within 5 parts by mass, a drop in initial color tone can be prevented.

In the present invention, an acrylic thermoplastic resin is employed as an optional component (E). The term acrylic resin refers to a polymer which has, as a structural repeating unit, at least one monomer unit selected from among acrylic acid, acrylic esters, acrylonitrile, and derivatives thereof, and which is a homopolymer or a copolymer with a comonomer such as styrene or butadiene. Examples of the acrylic resin include polyacrylic acid, polymethyl methacrylate (PMMA), polyacrylonitrile, ethyl acrylate-2-chloroethyl acrylate copolymer, n-butyl acrylate-acrylonitrile copolymer, acrylonitrile-styrene copolymer, acrylonitrile-butadiene copolymer, and acrylonitrile-butadiene-styrene copolymer. Of these, polymethyl methacrylate (PMMA) is particularly preferably employed.

Polymethyl methacrylate (PMMA) may be a known product and is generally produced through bulk polymerization of monomeric methyl methacrylate in the presence of a peroxide or azo polymerization initiator. In the present invention, PMMA preferably has a molecular weight of about 1,000 to about 200,000, from the viewpoint of compatibility with the aromatic polycarbonate resin (A) serving as a base resin matrix.

The acrylic thermoplastic resin is generally used in an amount of 0.001 to 1 part by mass with respect to 100 parts by mass of the aromatic polycarbonate resin (component (A)), preferably 0.005 to 0.5 parts by mass. When the amount of acrylic thermoplastic resin is 0.001 parts by mass or more, a light-diffusive polycarbonate-based resin composition exhibiting excellent light-guiding performance and high luminance can be realized, whereas when the amount is within 1 part by mass, phase separation of the acrylic resin component does not occur, and the formed composition does not become turbid. In this case, a light-diffusive polycarbonate-based resin composition exhibiting excellent light-guiding performance and high luminance can be produced.

The light-diffusive polycarbonate-based resin composition of the present invention may further contain an optional phosphorus-containing stabilizer (F).

Examples of the phosphorus-containing stabilizer include a phosphate compound and/or an aromatic phosphine compound.

Examples of the phosphate compound include phosphorous acid, phosphoric acid, phosphinic acid, phosphonic acid, and esters thereof. Specific examples include triphenyl phosphite, tris(nonylphenyl) phosphite, tris(2,4-di-tert-butylphenyl) phosphite, tridecyl phosphite, trioctyl phosphite, trioctadecyl phosphite, didecylmonophenyl phosphite, dioctylmonophenyl phosphite, diisopropylmonophenyl phosphite, monobutyldiphenyl phosphite, monodecyldiphenyl phosphite, monooctyldiphenyl phosphite, bis(2,6-di-tert-butyl-4-methylphenyl)pentaerythritol diphosphite, 2,2-methylenebis (4,6-di-tert-butylphenyl)octyl phosphite, bis(nonylphenyl) pentaerythritol diphosphite, bis(2,4-di-tert-butylphenyl) pentaerythritol diphosphite, distearylpentaerythritol diphosphite, tributyl phosphate, triethyl phosphate, trimethyl phosphate, triphenyl phosphate, diphenylmonoorthoxenyl phosphate, dibutyl phosphate, dioctyl phosphate, diisopropyl phosphate, tetrakis(2,4-di-tert-butylphenyl) 4,4'-biphenylenediphosphinate, dimethyl benzenephosphonate, diethyl benzenephosphonate, and dipropyl benzenephosphonate.

Of these, trisnonylphenyl phosphite, trimethyl phosphate, tris(2,4-di-tert-butylphenyl) phosphite, and dimethyl benzenephosphonate are preferred.

Examples of the aromatic phosphine compound include arylphosphine compounds represented by formula (IV):

$$P\text{—}(X)_3 \qquad (IV)$$

(wherein X represents a hydrocarbon group, and at least one X is an aryl group having 6 to 18 carbon atoms which may have a substituent).

Examples of the arylphosphine compound represented by formula (IV) include triphenylphosphine, diphenylbutylphosphine, diphenyloctadecylphosphine, tris-(p-tolyl) phosphine, tris-(p-nonylphenyl)phosphine, tris-(naphthyl) phosphine, diphenyl-(hydroxymethyl)-phosphine, diphenyl-(acetoxymethyl)-phosphine, diphenyl-(β-ethylcarboxyethyl)-phosphine, tris-(p-chlorophenyl)phosphine, tris-(p-fluorophenyl)phosphine, diphenylbenzylphosphine, diphenyl-β-cyanoethylphosphine, diphenyl-(p-hydroxyphenyl)-phosphine, diphenyl-1,4-dihydroxyphenyl-2-phosphine, and phenylnaphthylbenzylphosphine.

Of these, triphenylphosphine is particularly preferably employed.

The phosphorus-containing stabilizers may be used singly or in combination of two or more species.

The phosphorus-containing stabilizer of the present invention is generally used in an amount of 0.001 to 1 part by mass with respect to 100 parts by mass of aromatic polycarbonate resin (A), preferably 0.005 to 0.5 parts by mass, more preferably 0.01 to 0.1 parts by mass.

When the amount of phosphorus-containing stabilizer falls within the above range, thermal stability of the composition during molding is enhanced.

In the present invention, organopolysiloxane (G) may be incorporated to the composition in accordance with needs.

The organopolysiloxane compound employed in the present invention has at least one group selected from among an alkoxy group, a vinyl group, and a phenyl group. For example, a reactive silicone compound (e.g., organosiloxane); i.e., a silicone compound having at least one group selected from among a methoxy group, a vinyl group, and a phenyl group, is preferred.

The aforementioned component (G) can enhance stability of the resin composition during molding by preventing bad appearance such as yellowing or silver streaks and bubbling which would otherwise be caused by thermal deterioration during molding.

Generally, the amount of component (G) may be appropriately selected from a range of 0.01 to 1 part by mass with respect to 100 parts by mass of aromatic polycarbonate resin (A). When the amount is 0.01 parts by mass or more, thermal stabilization effect of the incorporated component is fully attained, whereas when the amount is 1 part by mass or less, bad appearance such as haze of molded products can be prevented.

If required, the composition of the present invention may further contain (H) an alicyclic epoxy compound in order to enhance steam resistance (i.e., resistance to hydrolysis).

The alicyclic epoxy compound, which is component (H) of the present invention, is a cyclic aliphatic compound having an alicyclic epoxy group; i.e., an epoxy group formed of an ethylenic bond to which one oxygen atom has been added. Specifically, preferably employed are the following compounds represented by formula (V) to (XIV):

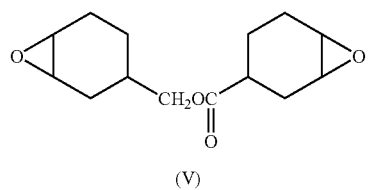

(V)                                   [F6]

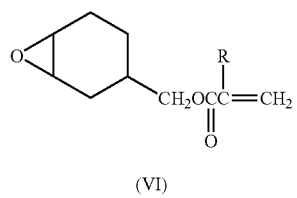

(VI)                                  [F7]

(wherein R represents H or CH$_3$),

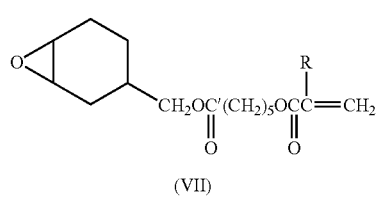

(VII)                                 [F8]

(wherein R represents H or CH$_3$),

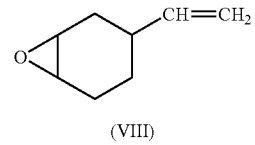

(VIII)                                [F9]

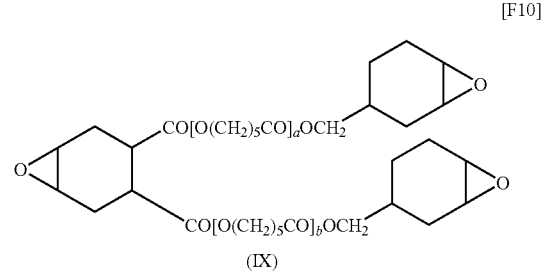

(IX)                                  [F10]

(a + b = 1 or 2),

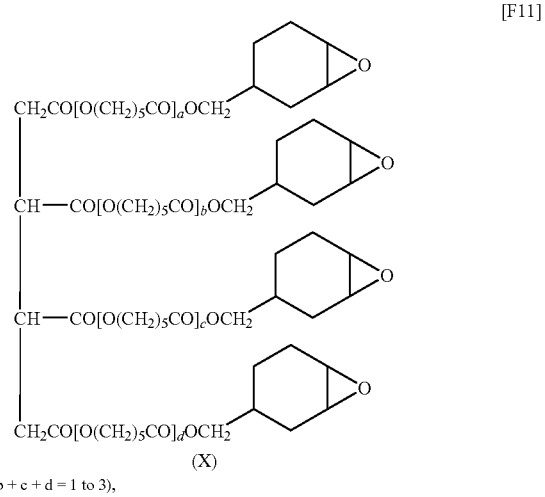

(X)                                   [F11]

(a + b + c + d = 1 to 3),

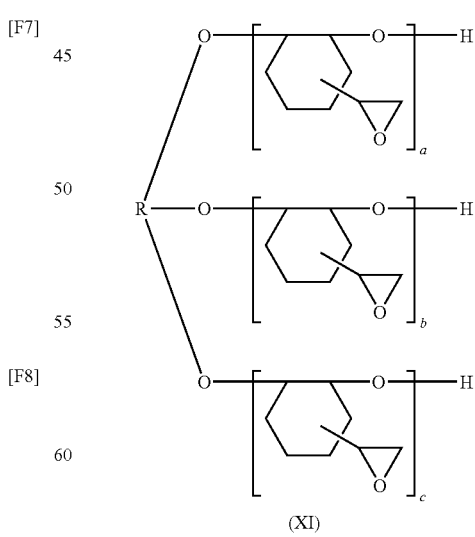

(XI)                                  [F12]

(a+b+c=n (integer), wherein R represents hydrocarbon group),

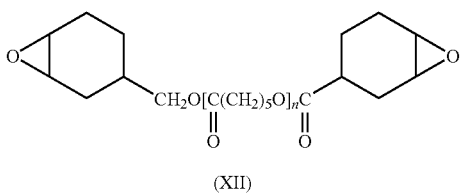

(XII)

(wherein n is an integer),

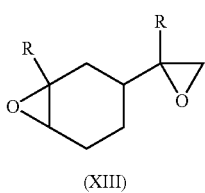

(XIII)

(wherein R represents hydrocarbon group),

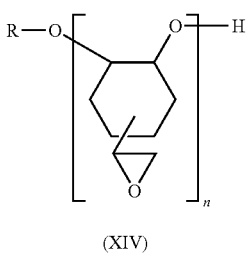

(XIV)

(wherein n is an integer and R represents hydrocarbon group).

Among them, compounds represented by formulas (V), (X), and (XIV) are more preferably employed, since these compounds exhibit excellent compatibility to aromatic polycarbonate resin and do not impair transparency.

Through incorporation of the alicyclic epoxy compound (component (H)) into the resin composition of the present invention, transparency is further enhanced, and stream resistance (resistance to hydrolysis) is also enhanced.

The alicyclic epoxy compound, which is component (H), is generally used in an amount of 0.01 to 1 part by mass with respect to 100 parts by mass of aromatic polycarbonate resin (A), preferably 0.02 to 0.2 parts by mass.

When the amount is 0.01 parts by mass or more, transparency and steam resistance are enhanced.

When the amount is 1 part by mass or less, phase separation is prevented, and satisfactory transparency is attained.

If required, in addition to the aforementioned components, a variety of additives may be incorporated into the light-diffusive polycarbonate-based resin composition of the present invention. Examples of the additives include antioxidants such as a hindered phenol antioxidant and an ester-based antioxidant; a photostabilizer such as a hindered amine compound; and generally employed additives such as a flame retardant, a flame retarding aid, a mold releasing agent, an antistatic agent, and a colorant.

The light-diffusive polycarbonate-based resin composition of the present invention may be produced through mixing the aforementioned components and optionally melt-kneading the mixture. Mixing and melt-kneading may be performed through a conventional technique; for example, by means of a ribbon blender, a Henschel mixer, a Banbury mixer, a drum tumbler, a single-screw extruder, a twin-screw extruder, a Ko-kneader, or a multi-screw extruder.

The heating temperature during melt-kneading is generally adjusted to 250 to 300° C. Since the light-diffusive polycarbonate-based resin composition of the invention exhibits remarkably enhanced flowability of resin and enhanced residence stability in a molding machine such as an injection molding apparatus, the composition can be injection-molded to form light-diffusing plates of a 20-inch-size or wider for use in displays such as LCDs. Thus, problems involved in light-diffusing plates made of acrylic resin; i.e., poor heat resistance, poor moisture absorption resistance, and warpage caused by an increased plate size, can be solved, whereby a wide-area and thin (2 mm) light-diffusing plate exhibiting excellent heat and moisture absorption resistance can be formed from a polycarbonate-based resin.

The light-diffusing plate of the invention can be suitably employed as liquid crystal display-related materials and parts by mass, optical parts by mass, and glass substitutes. Examples of optical parts by mass include optical elements such as an optical lens, a light-guiding plate (light guide), and a light-diffusing plate. Examples of glass substitutes include covers for street lamps and reinforced laminated glass panes for vehicles and buildings.

EXAMPLES

The present invention will next be described in more detail by way of examples, which should not be construed as limiting the invention thereto.

Production Example 1

Production of Styrene-Phenyl Methacrylate Copolymer

To a 1,000-cm$^3$ Erlenmeyer flask equipped with a three way stop-cock, styrene (84 parts by mass) and phenyl methacrylate (16 parts by mass) as monomers and benzoyl peroxide (1.2 parts by mass) as an initiator were added, followed by mixing for dissolution to form a monomer liquid. The flask was purged with nitrogen gas for about one hour. Subsequently, pure water (2,800 g) was added to the flask, and the mixture was heated to 85° C. so as to initiate polymerization. Polymerization was performed at 85° C. for 6 hours and at 98° C. for 3 hours.

The thus-produced styrene-phenyl methacrylate copolymer was dehydrated and dried, to thereby yield a styrene-phenyl methacrylate copolymer (SAC1) having an MI of 100 g/10 min.

Production Example 2

Production of Styrene-Methyl Methacrylate Copolymer

The polymerization procedure of Production Example 1 was repeated, except that styrene (80 parts by mass) and methyl methacrylate (20 parts by mass) were employed instead of styrene (84 parts by mass) and phenyl methacrylate (16 parts by mass), to thereby yield a styrene-methyl methacrylate copolymer (SAC2) having an MI of 90 g/10 min.

Production Example 3

Production of Polycarbonate-Based Copolymer

A polycarbonate copolymer was produced through the following procedure.

(Production of polytetramethylene glycol bis(4-hydroxybenzoate))

Under nitrogen, polytetramethylene glycol (PTMG, Mn=2,000) (100 parts by mass) and methyl p-hydroxybenzoate (16.7 parts by mass) were heated at 210° C. in the presence of dibutyltin oxide (0.5 parts by mass), and methanol was distilled off.

The reaction system was evacuated, whereby excessive methyl p-hydroxybenzoate was removed. The reaction product was dissolved in methylene chloride, and 8% by mass aqueous sodium hydrogencarbonate solution was added to the methylene chloride solution, followed by vigorous mixing for 20 minutes. The methylene chloride phase was collected through centrifugation and concentrated under reduced pressure, to thereby yield polytetramethylene glycol bis(4-hydroxybenzoate). Through high performance liquid chromatography (HPLC), p-hydroxybenzoic acid and methyl p-hydroxybenzoate were quantitated. p-Hydroxybenzoic acid content was found to be 10 mass ppm or less, and methyl p-hydroxybenzoate content was found to be 0.2% by mass. HPCL was performed through the following procedure. An ODS-3 column (product of GL Science) was employed. At a column temperature of 40° C., measurement was performed under a flow of a solvent mixture of 0.5% aqueous phosphoric acid solution and acetonitrile (1:2) at 1.0 mL/min. Quantitation was performed on the basis of a calibration curve drawn by use of a standard.

(Production of Polycarbonate Oligomer Solution)

Sodium dithionite was added to 5.6% by mass aqueous sodium hydroxide solution such that the sodium dithionite concentration was adjusted to 2,000 ppm with respect to the amount of bisphenol A (BPA) to be dissolved. Then, BPA was dissolved in the thus-prepared aqueous solution so that the BPA concentration was adjusted to 13.5% by mass, to thereby prepare an aqueous solution of BPA in sodium hydroxide. The aqueous solution of BPA in sodium hydroxide (40 L/hr), methylene chloride (15 L/hr), and phosgene (4.0 kg/hr) were continuously fed to a tube reactor (inner diameter: 6 mm, tube length: 30 m). The tube reactor had a jacket, and the temperature of the reaction mixture was maintained at 40° C. or lower through passage of cooling water through the jacket. The reaction mixture which had passed through the tube reactor was continuously transferred to a tank reactor (capacity: 40 L) equipped with sweepback blades and a baffle arrangement. To the tank reactor, the aqueous solution of BPA in sodium hydroxide (2.8 L/hr), 25% by mass aqueous sodium hydroxide solution (0.07 L/hr), water (17 L/hr), and 1% by mass aqueous triethylamine solution (0.64 L/hr) were added, and the mixture was allowed to react. The reaction mixture discharged from the tank reactor was continuously collected and was allowed to stand, whereby the methylene chloride phase was separated from the aqueous phase.

The thus-produced polycarbonate oligomer solution was found to have a concentration of 329 g/L and a chloroformate content of 0.74 mol/L.

(Production of PCC1)

To a 50-L tank reactor equipped with a baffle plate, a paddle-form agitation blade, and a cooling jacket, the above-produced polycarbonate oligomer solution (15 L), methylene chloride (8.6 L), the above-produced polytetramethylene glycol bis(4-hydroxybenzoate) (average molecular weight of PTMG chain: 2,000) (650 g), and triethylamine (8.5 mL) were placed. Under stirring, 6.4% by mass aqueous sodium hydroxide solution (2,673 g) was added to the reaction mixture, and reaction between the polycarbonate oligomer and polytetramethylene glycol bis(4-hydroxybenzoate) was performed for 10 minutes.

To this polymerization liquid, p-t-butylphenol (PTBP) methylene chloride solution (PTBP (145 g) dissolved in methylene chloride (1.0 L)) and BPA sodium hydroxide aqueous solution (prepared by dissolving NaOH (518 g) and sodium dithionite (1.7 g) in water (7.6 L) and dissolving BPA (862 g) in the aqueous solution) were added, and the mixture was allowed to polymerize for 30 minutes.

Methylene chloride (15 L) was added to the polymerization mixture for dilution, followed by stirring for 10 minutes. Subsequently, the organic phase containing polycarbonate was isolated from the aqueous phase containing excessive BPA and NaOH.

The thus-produced polycarbonate methylene chloride solution was sequentially washed with 15-vol % 0.03 mol/L NaOH aqueous solution and 0.2N HCl, followed by repeatedly washing with pure water until conductance of the aqueous phase after washing reached 0.01 µS/m or less.

The polycarbonate methylene chloride solution obtained through washing was concentrated, and the formed solid was pulverized, to thereby form flakes of the polycarbonate. The flakes were dried under reduced pressure at 100° C.

Through NMR, the polycarbonate was found to have a polytetramethylene glycol bis(4-hydroxybenzoate) residue content of 10.7% by mass.

The viscosity number as determined in accordance with ISO 1628-4 (1999) was 34.5.

Refraction index of the polycarbonate, determined by means of a refractometer (PR-2, product of Carl Zeiss Jena) through the V-block method (d ray, at 25° C.), was 1.580.

(Determination of Comonomer Content)

$^1$H-MNR of the copolymer was measured, and proton peaks (underlined) were assigned as follow:

$\delta$1.4-1.9: C$\underline{H_3}$ and —O—C$\underline{H_2}$—C$\underline{H_2}$—C$\underline{H_2}$—C$\underline{H_2}$— of BPA $\delta$3.3-3.5: —O—C$\underline{H_2}$—CH$_2$—CH$_2$—C$\underline{H_2}$—

$\delta$4.3-4.4: —CO—O—C$\underline{H_2}$—CH$_2$—CH$_2$—CH$_2$—

A comonomer content was obtained through calculating a molar ratio of the phenol-modified diol carbonate moiety represented by formula (II) and that of the BPA carbonate moiety represented by formula (I) from respective integral intensity values through the calculation procedure as described hereinbelow and reducing the values to the corresponding weight-basis values. The amount of phenol-modified diol carbonate moiety represented by formula (II) in the copolymer and that of BPA carbonate moiety represented by formula (I) in the copolymer were 10.7% by mass.

(Equations for Calculation)

Equations for calculation are as follow.

When integral intensity in the range of $\delta$1.4-1.9, that in the range of $\delta$3.3-3.5, and that in the range of $\delta$4.3-4.4 were 929.5, 179.5, and 5.9, respectively, repetition number (n) was 31.4 (n=(179.5/5.9)+1=31.4). Thus, the mole ratio of BPA carbonate moiety was calculated to 98.8 mol % ([(929.5−179.5−5.9)/6]/{(5.9/4)+[(929.5−179.5−5.9)/6]}×100=98.8 mol %) and that of phenol-modified diol carbonate moiety was 1.18 mol % ((5.9/4)/{(5.9/4)+[(929.5−179.5−5.9)/6]})× 100=1.18 mol %), by use of the following relationships:

$BPA$=[(929.5−179.5−5.9)/6]=124.0, and phenol-modified diol=(5.9/4)=1.475.

Thus, the phenol-modified diol carbonate content [% by mass] of the copolymer was calculated to be 10.7% by mass (1.18×(136+120+31.4×72+12+16)/(1.18×(136+120+31.4×72+12+16)+9 8.8×254)×100=10.7% by mass).

Examples 1 to 12 and Comparative Examples 1 to 4

In the Examples and Comparative Examples, the materials as described below were mixed at proportions as given in Table 1. These components were fed to a single screw kneader-extruder (die: 40 mm) (model: VS-40, product of Taguchi Plastics Co.) and pelletized at a kneading temperature of 280° C. and a screw rotation of 100 rpm.

In Table 1, the unit "% by mass" of each additive is on the basis of aromatic PC resin.

[Components of the Composition]

(A) Aromatic PC Resin

PC1: Polycarbonate polymer Tarflon FN1500 (trade name, product of Idemitsu Kosan Co., Ltd., viscosity average molecular weight: 14,500, and refractive index: 1.583)

PCC1: Polycarbonate-based copolymer produced in Production Example 3

(B) Light-Diffusing Agent

KMP590: particulated silicone resin (trade name, product of Shin-Etsu Chemical Co., Ltd., mean particle diameter: 5 μm)

(C) Flowability-Improving Agent (Styrene-(Meth)Acrylic Ester Copolymer)

SAC1: styrene-phenyl methacrylate copolymer produced in Production Example 1

SAC2: styrene-methyl methacrylate copolymer produced in Production Example 2

(D) UV-Absorber

Kemisorb 79: benzotriazole-based UV-absorber (trade name, product of Chemipro Kasei Kaisha, Ltd.)

Hostavin B-CAP: malonate ester-based UV-absorber (trade name, product of Clariant K.K.)

Sanduvor VSU: oxalylanilide UV-absorber (trade name, product of Clariant K.K.)

Hostavin RP-25: malonate ester-based UV-absorber (trade name, product of Clariant K.K.)

ULS1635: benzotriazole-based UV-absorber (trade name, product of Ipposha Oil Industries Co., Ltd.)

(E) Acrylic Thermoplastic Resin

BR-83: polymethyl methacrylate (PMMA), Dianal BR-83 (trade name, product of Mitsubishi Rayon Co., Ltd., viscosity average molecular weight: 40,000)

(F) Phosphorus-Containing Stabilizer

JC-263: triphenylphosphine (trade name, product of Johoku Chemical Co., Ltd.)

(G) Organopolysiloxane

KR511: organopolysiloxane having a phenyl group, a methoxy group, and a vinyl group (trade name, product of Shin-Etsu Silicones Co., Ltd., refractive index: 1.518)

(H) Alicyclic Epoxy Compound

2021P: Celloxide 2021P (trade name, product of Daicel Chem. Ind., Ltd., compound of formula (V))

TABLE 1

|  | (A) Aromatic PC-based polymer | | | | (B) Light-diffusing agent | | (C) Flowability improver | | (D) UV absorber | |
|---|---|---|---|---|---|---|---|---|---|---|
|  | Type | Amount (% by mass) | Type | Amount (% by mass) | Type | Amount (% by mass) | Type | Amount (% by mass) | Type | Amount (% by mass) |
| Ex. 1 | PC1 | 100 | — | — | KMP590 | 0.5 | SAC1 | 7 | — | — |
| Ex. 2 | PC1 | 100 | — | — | KMP590 | 0.5 | SAC1 | 10 | — | — |
| Ex. 3 | PC1 | 100 | — | — | KMP590 | 0.5 | SAC1 | 7 | — | — |
| Ex. 4 | PC1 | 100 | — | — | KMP590 | 0.5 | SAC1 | 7 | — | — |
| Ex. 5 | PC1 | 100 | — | — | KMP590 | 0.5 | SAC1 | 7 | — | — |
| Ex. 5 | PC1 | 100 | — | — | KMP590 | 0.5 | SAC1 | 7 | — | — |
| Ex. 6 | PC1 | 100 | — | — | KMP590 | 0.5 | SAC1 | 7 | Kemisorb 79 | 0.3 |
| Ex. 7 | PC1 | 100 | — | — | KMP590 | 0.5 | SAC1 | 7 | Hostavin B-CAP | 0.3 |
| Ex. 8 | PC1 | 100 | — | — | KMP590 | 0.5 | SAC2 | 7 | Sanduvor VSU | 0.3 |
| Ex. 9 | PC1 | 100 | — | — | KMP590 | 0.5 | SAC2 | 7 | Hostavin PR-25 | 0.6 |
| Ex. 10 | PC1 | 100 | — | — | KMP590 | 0.5 | SAC2 | 7 | ULS 1635 | 0.6 |
| Ex. 11 | PC1 | 70 | PCC1 | 30 | KMP590 | 0.5 | SAC1 | 5 | Hostavin B-CAP | 0.3 |
| Ex. 12 | PC1 | 70 | PCC1 | 30 | KMP590 | 0.5 | SAC2 | 5 | Hostavin B-CAP | 0.3 |
| Comp. Ex. 1 | PC1 | 100 | — | — | KMP590 | 0.5 | — | — | — | — |
| Comp. Ex. 2 | PC1 | 100 | — | — | KMP590 | 0.5 | SAC1 | 0.05 | — | — |
| Comp. Ex. 3 | PC1 | 100 | — | — | KMP590 | 0.5 | SAC1 | 30 | — | — |
| Comp. Ex. 4 | PC1 | 100 | — | — | KMP590 | 0.5 | — | — | Hostavin B-CAP | 0.3 |

|  | (E) Acrylic thermoplastic resin | | (F) P-containing stabilizer | | (G) Organopolysiloxane | | (H) Alicyclic epoxy compd. | |
|---|---|---|---|---|---|---|---|---|
|  | Type | Amount (% by mass) | Type | Amount (% by mass) | Type | Amount (% by mass) | Type | Amount (% by mass) |
| Ex. 1 | — | — | — | — | — | — | — | — |
| Ex. 2 | — | — | — | — | — | — | — | — |
| Ex. 3 | BR83 | 0.1 | — | — | — | — | — | — |
| Ex. 4 | BR83 | 0.1 | JC263 | 0.3 | — | — | — | — |
| Ex. 5 | BR83 | 0.1 | JC263 | 0.3 | KR511 | 0.1 | — | — |
| Ex. 5 | BR83 | 0.1 | JC263 | 0.3 | KR511 | 0.1 | 2021P | 0.05 |
| Ex. 6 | BR83 | 0.1 | JC263 | 0.3 | KR511 | 0.1 | — | — |
| Ex. 7 | BR83 | 0.1 | JC263 | 0.3 | KR511 | 0.1 | — | — |

TABLE 1-continued

| | | | | | | | | |
|---|---|---|---|---|---|---|---|---|
| Ex. 8 | BR83 | 0.1 | JC263 | 0.3 | KR511 | 0.1 | — | — |
| Ex. 9 | BR83 | 0.1 | JC263 | 0.3 | KR511 | 0.1 | — | — |
| Ex. 10 | BR83 | 0.1 | JC263 | 0.3 | KR511 | 0.1 | — | — |
| Ex. 11 | BR83 | 0.1 | JC263 | 0.3 | KR511 | 0.1 | — | — |
| Ex. 12 | BR83 | 0.1 | JC263 | 0.3 | KR511 | 0.1 | — | — |
| Comp. Ex. 1 | — | — | — | — | — | — | — | — |
| Comp. Ex. 2 | — | — | — | — | — | — | — | — |
| Comp. Ex. 3 | — | — | — | — | — | — | — | — |
| Comp. Ex. 4 | — | — | — | — | — | — | — | — |

Flowability was evaluated by flow value (Q value) and spiral flow length (SFL value) of pellets of each sample through a method described hereinbelow.

Moldability of each sample was evaluated by means of a 650-t injection molding apparatus (model: MD650AP, product of Niigata Machine Techno Co., Ltd.). Specifically, pellets of each sample were injection-molded at a molding temperature of 280° C. and a mold temperature of 100° C., to form a light-diffusing plate having a size of 32 inches (81.3 cm) and a thickness of 2 mm.

Color tone and light-fastness of each sample were evaluated in terms of light transmittance, haze, YI, and light-fastness of a molded product. Specifically, pellets of each sample were injection-molded by means of a 40-t injection molding apparatus (model: EC40N, product of Toshiba Machine Co., Ltd.) at a molding temperature of 300° C. and a mold temperature of 100° C., to form a molded piece for evaluation (140 mm×140 mm×2 mm thickness).

These properties were evaluated through the following methods.

(1) Flowability

Q value: Each sample was tested by means of a Koka-type flow tester in accordance with JIS K7210. The amount (mL/sec) of molten resin discharged through a nozzle (diameter: 1 mm, length: 10 mm) at 280° C. and 15.7 MPa was measured. Flow value (Q value) increases with decreasing melt viscosity.

SFL: Evaluated at an injection molding temperature of 280° C., an injection pressure of 7.8 MPa, a mold temperature of 80° C., and a thickness of 2 mm.

(2) Moldability

When a light-diffusing plate (32 inches, 2 mm) formed through injection-molding under the aforementioned conditions had a tolerance in thickness of within ±100 μm, the sample was rated as "satisfactory (O)."

(3) Transmittance

Determined in accordance with JIS K7105.

(4) Haze

Determined in accordance with JIS K7105.

(5) Color Tone (YI)

By means of a spectorphotometer (LCM2020 Plus, product of Gretag Macbeth), YI, chromaticity (x, y), and light transmittance (400 nm) of each sample were determined by use of an F light source and in a 10° visual field.

(6) Light-Fastness Test

A light-fastness tester (UVCON UC-1, product of Atlas) was used to measure color difference ΔE of each sample after irradiation of the sample with light from a fluorescent UV lamp at 65° C. for 24 hours.

No yellowing or bubbling was observed in light-diffusing plates molded in the Examples. All the samples of the Examples were found to have a tolerance in thickness of within ±100 μm.

(7) Residence Stability Test (ΔYI)

A spectorphotometer (LCM2020 Plus, product of Gretag Macbeth) with a C light source was used to measure YI of a color plate produced through molding by means of a 40-t injection molding apparatus without maintaining the resin in the apparatus and YI of a color plate produced through molding by means of the injection molding apparatus while maintaining the resin in the apparatus for 15 minutes. The difference in YI was evaluated.

The results are collectively shown in Table 2.

TABLE 2

| | Q value | SFL (mm) | Moldability (32 inch) | Transmittance (%, 2 mm) | Haze (%, 2 mm) | YI (F light source) | Light resistant property (100 hr irradiation) ΔYI (F light source) | Residence stability ΔYI (C light source) |
|---|---|---|---|---|---|---|---|---|
| Ex. 1 | 78 | 400 | O | 61.0 | 93.5 | 60 | 15 | 5 |
| Ex. 2 | 95 | 470 | O | 60.0 | 93.7 | 62 | 15 | 5 |
| Ex. 3 | 78 | 400 | O | 62.0 | 93.2 | 58 | 15 | 5 |
| Ex. 4 | 78 | 400 | O | 62.0 | 93.2 | 59 | 15 | 5 |
| Ex. 5 | 78 | 400 | O | 62.5 | 93.2 | 58 | 15 | 5 |
| Ex. 6 | 78 | 400 | O | 62.5 | 93.2 | 60 | 10 | 6.5 |
| Ex. 7 | 78 | 400 | O | 62.5 | 93.2 | 58 | 7 | 6.5 |
| Ex. 8 | 70 | 370 | O | 63.0 | 93.0 | 58 | 7 | 7.0 |
| Ex. 9 | 70 | 370 | O | 63.0 | 93.0 | 58 | 9 | 7.0 |
| Ex. 10 | 70 | 370 | O | 63.0 | 93.0 | 60 | 8 | 6.5 |
| Ex. 11 | 100 | 500 | O | 62.5 | 93.2 | 61 | 7 | 7.0 |
| Ex. 12 | 95 | 480 | O | 63.0 | 93.0 | 58 | 7 | 7.5 |
| Comp. Ex. 1 | 40 | 300 | X | 63.5 | 93.2 | 60 | 13 | 5.0 |
| Comp. Ex. 2 | 40 | 300 | X | 63.5 | 93.2 | 60 | 13 | 5.0 |
| Comp. Ex. 3 | 150 | 800 | O | 58.0 | 94.5 | 65 | 18 | 5.0 |
| Comp. Ex. 4 | 40 | 300 | X | 63.5 | 93.2 | 60 | 7 | 18 |

INDUSTRIAL APPLICABILITY

Since the light-diffusive polycarbonate-based resin composition of the invention has remarkably enhanced flowability, the composition is suitable for a light-diffusing plate for use in LCDs and similar devices of a relatively large size of 20 inches or more and can also be suitably used for optical elements including an optical lens, a light-guiding plate (light guide), and a light-diffusing plate; as well as glass substitutes including covers for street lamps and window panes for vehicles and buildings.

The invention claimed is:

1. A light-diffusive polycarbonate-based resin composition which comprises (A) 100 parts by mass of an aromatic polycarbonate resin, (B) 0.01 to 10 parts by mass of a light-diffusing agent, and (C) 1 to 20 parts by mass of a styrene-(meth)acrylic ester copolymer.

2. The light-diffusive polycarbonate-based resin composition as described in claim 1, which further comprises (D) at least one UV-absorber selected from the group consisting of a malonate ester compound, an oxalylanilide compound, and a benzotriazole compound, in an amount of 0.05 to 5 parts by mass.

3. The light-diffusive polycarbonate-based resin composition as described in claim 1, which further comprises (E) an acrylic thermoplastic resin in an amount of 0.01 to 1 parts by mass.

4. The light-diffusive polycarbonate-based resin composition as described in claim 1, which further comprises (F) a phosphorus-containing stabilizer in an amount of 0.001 to 1 parts by mass.

5. The light-diffusive polycarbonate-based resin composition as described in claim 1, which further comprises (G) organopolysiloxane in an amount of 0.01 to 1 parts by mass, wherein the difference in refractive index between the organopolysiloxane and the aromatic polycarbonate resin component (A) is 0.01 or less.

6. The light-diffusive polycarbonate-based resin composition as described in claim 1, which further comprises (H) an alicyclic epoxy compound in an amount of 0.001 to 1 parts by mass.

7. The light-diffusive polycarbonate-based resin composition as described in claim 1, wherein the aromatic polycarbonate resin component (A) is a polycarbonate copolymer which comprises a structural repeating unit represented by the formula (I) and a structural repeating unit represented by the formula (II):

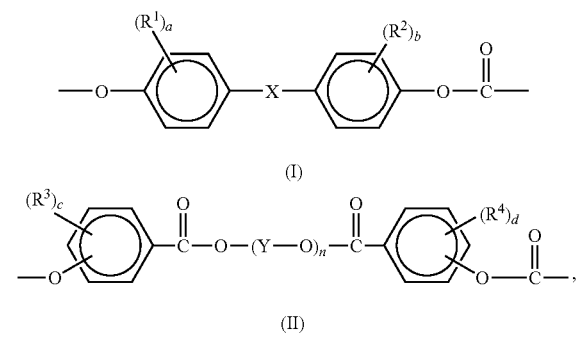

wherein each of $R^1$ and $R^2$ represents an alkyl group having 1 to 6 carbon atoms; X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, —S—, —SO—, —SO$_2$—, —O—, —CO—, or a bond represented by the formula (III-1) or (III-2):

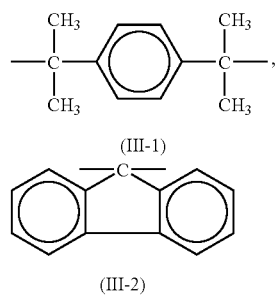

wherein each of $R^3$ and $R^4$ represents an alkyl group having 1 to 3 carbon atoms; Y represents a linear or branched alkylene group having 2 to 15 carbon atoms; n is an integer of 2 to 200; and each of a, b, c, and d is an integer of 0 to 4, and wherein said polycarbonate copolymer comprises the structural repeating unit (II) in the amount of 1 to 30% by mass and has a viscosity number of 30 to 71.

8. The light-diffusive polycarbonate-based resin composition as described in claim 7, wherein, in the formula (II), Y is a member selected from the group consisting of —CH$_2$—CH$_2$—CH$_2$—CH$_2$—, —CH$_2$—CH$_2$—CH$_2$—CH(CH$_3$)—, and —CH$_2$—CH$_2$—CH$_2$—, and Y in one (Y—O) may be different from Y in another (Y—O).

9. The light-diffusive polycarbonate-based resin composition as described in claim 7, wherein the (A) aromatic polycarbonate resin is a mixture of the polycarbonate copolymer and another aromatic polycarbonate resin.

10. The light-diffusive polycarbonate-based resin composition as described in claim 1, wherein the (C) copolymer is a copolymer formed from styrene and a (meth)acrylic ester at a mole ratio of 50:50 to 99:1.

11. The light-diffusive polycarbonate-based resin composition as described in claim 10, wherein the (meth)acrylic ester serving as a monomer for forming the (C) copolymer is phenyl methacrylate and/or methyl methacrylate.

12. The light-diffusive polycarbonate-based resin composition as described in claim 4, wherein the (F) phosphorus-containing stabilizer is at least one species selected from the group consisting of a phosphate ester compound and an aromatic phosphine compound.

13. The light-diffusive polycarbonate-based resin composition as described in claim 3, wherein the (E) acrylic thermoplastic resin is selected from resins having a viscosity average molecular weight of 1,000 to 200,000.

14. A light-diffusing plate formed through molding a light-diffusive polycarbonate-based resin composition of claim 1, wherein said plate has a thickness of 0.5 to 3 mm.

* * * * *